Patented June 22, 1948

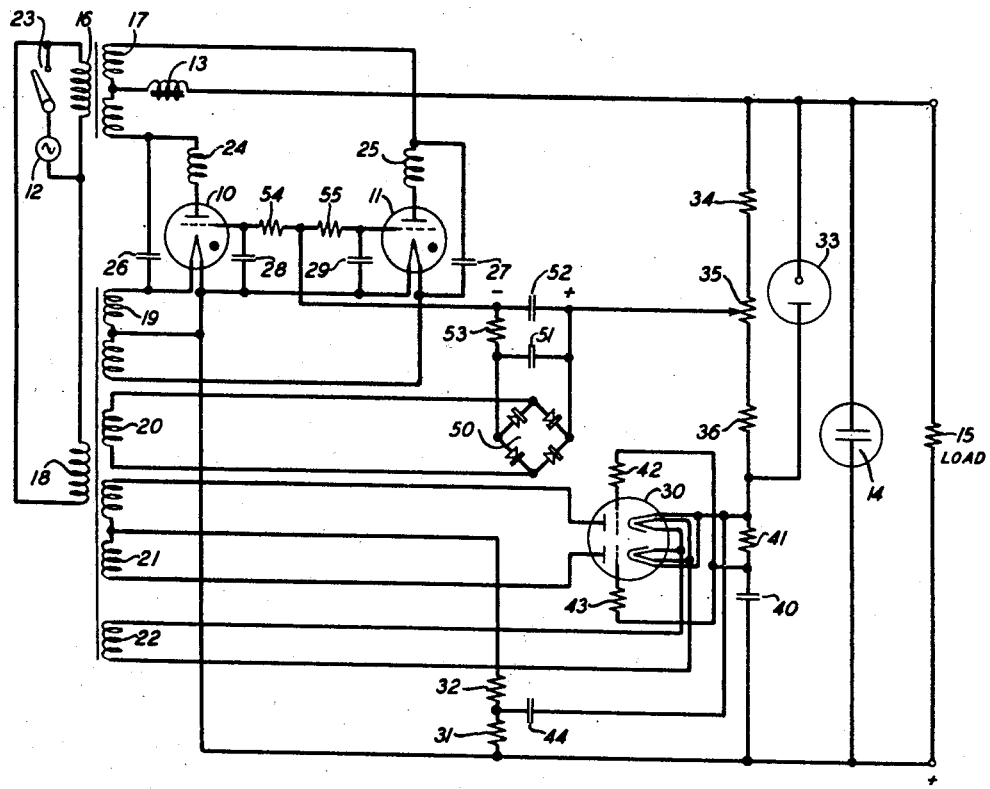

2,443,638

UNITED STATES PATENT OFFICE 2,443,638

REGULATED RECTIFIER

James A. Potter, Rutherford, N. J., assignor to Bell Telephone Laboratories, Incorporated, New York, N. Y., a corporation of New York Application April 18, 1946, Serial No. 662,954

9 Claims. (Cl. 175—363)

This invention relates to current supply apparatus and particularly to a regulated rectifier for supplying rectified current to a load.

An object of the invention is to provide improved means for delaying the flow of space current in a space discharge device while the cathode of the device is being heated to operating temperature.

Another object of the invention is to provide improved apparatus for regulating the current supplied to a load to minimize load voltage variations.

In accordance with a specific embodiment of the invention herein shown and described for the purpose of illustration, there is provided for supplying unidirectional current to a load a main rectifier employing three-electrode space discharge rectifying devices. In a shunt current path connected across the load there are provided in series a resistor, the output voltage of an auxiliary space discharge rectifier, and a constant voltage device, specifically, a cold cathode, gas-filled discharge tube. A potentiometer is connected in a shunt path across the cold cathode tube. The control electrode-cathode path of the main rectifier is completed by a path connecting an adjustable tap of the potentiometer to the control electrode of the rectifier tubes and including the output voltage of a second auxiliary rectifier, said output voltage having variations corresponding to line voltage changes. In normal operation the voltage in the control electrode-cathode circuit of the main rectifier tubes having variations corresponding to load and line voltage changes controls the current supplied to the load to minimize load voltage changes.

The first auxiliary rectifier supplies current to a current path comprising a resistor and a condenser in series, the resistor being connected in the control circuit of the first auxiliary rectifier. When the regulated rectifier is connected to an alternating current supply source, the output voltage of the second auxiliary rectifier in the grid-cathode circuit of the main rectifier prevents the flow of space current in the main rectifier tubes. As the condenser is charged by the rectified current from the first auxiliary rectifier, the negative grid biasing potential of the first auxiliary rectifier decreases with the result that the control electrodes of the main rectifier tubes become relatively less negative as the charge on the condenser increases until the main rectifier tubes commence to pass space current. The starting of space current in the main rectifier tubes is thus delayed for a period in which the cathodes of the tubes are heated to operating temperature, thus preventing damage to the cathodes. Thereafter the output voltage of the first auxiliary rectifier continues to increase due to the further charging of the condenser, with the result that the output voltage of the main rectifier also increases, until the resultant voltage across the cold cathode, constant voltage tube is sufficient to cause it to become conducting. The control circuit then operates to minimize load voltage changes. The condenser also discharges slowly so that if the power supply is interrupted for a relatively short time such that the cathodes of the main rectifier tubes remain heated to some extent due to heating current previously supplied thereto, the condenser remains partly charged at the time that its recharging is initiated when the power is restored. The delay period during which conduction in the main rectifier tubes is prevented is thus correspondingly reduced.

The invention will now be described with reference to the accompanying drawing, the single figure of which is a schematic view of a regulated rectifier constructed in accordance with the invention.

Referring to the drawing, there is shown a main rectifier comprising space discharge devices 10 and 11, preferably of the gas-filled type, for rectifying current from an alternating current supply source 12 and for supplying the rectified current through a ripple filter comprising series inductance element 13 and an 800-microfarad electrolytic condenser 14 to a load 15. Rectifier tubes 10 and 11 may be of the 393A Western Electric Company type, for example. There are provided two transformers, one having a primary winding 16 and a secondary winding 17, and the other having a primary winding 18 and secondary windings 19, 20, 21 and 22. A switch 23, when operated, closes a circuit for supplying current from the alternating current supply source 12 to the primary windings 16 and 18. The end terminals of transformer winding 17 are connected to the anodes of tubes 10 and 11, respectively, through inductance coils 24 and 25, respectively, and the mid-terminal of transformer winding 17 is connected through inductance coil 13 to the negative load terminal. Transformer winding 19 supplies heating current to the cathodes of rectifier tubes 10 and 11 and the mid-terminal of winding 19 is connected to the positive load terminal. A 0.01-microfarad condenser 26 is provided in a path connecting the common terminal of transformer winding 17 and inductance coil 24 with the cathode of tube 10 and a similar condenser 27 is provided in a path connecting the common terminal of winding 17 and inductance coil 25 with the cathode of tube 11. A condenser 28 of 0.006 microfarad is provided in a path connecting the control electrode and cathode of tube 10 and a similar condenser 29 is provided in a path connecting the control electrode and cathode of tube 11.

There is provided a first auxiliary rectifier comprising a twin triode space discharge tube 30 for setting up an output voltage in a shunt current path connected across the load 15, this voltage being in aiding relationship with respect to the output voltage of the main rectifier. The tube 30 may be an RCA 6SN7-GT type. This shunt circuit may be traced from the positive load terminal through 470-ohm resistor 31, 1,000-ohm resistor 32, the rectifier comprising tube 30 and a cold cathode, gas-filled voltage regulator tube 33 to the negative load terminal. The tube 33 may be an RCA VR150 type, which has the characteristic that its resistance decreases as the current through the tube increases at such a rate that the voltage across the tube terminals remains substantially constant. Across the tube 33 is connected a current path comprising in series 33,000-ohm resistor 34, 10,000-ohm potentiometer 35 and 47,000-ohm resistor 36. Current is supplied to the cathode heater of tube 30 from transformer winding 22. The end terminals of transformer winding 21 are connected to the anodes, respectively, of tube 30 and a mid-terminal of winding 21 is connected through resistors 32 and 31 to the positive load terminal. The cathodes of tube 30 are connected to the common terminal of tube 33 and resistor 36. The first auxiliary rectifier also supplies current for charging a 4-microfarad condenser 40 through a circuit comprising one megohm resistor 41, the cathodes of tube 30 being connected through resistor 41 and condenser 40 in series to the positive load terminal. The control electrodes of tube 30 are connected through 47,000-ohm resistors 42 and 43, respectively, to the common terminal of condenser 40 and resistor 41. The voltage drop across resistor 41 thus biases the control electrodes with respect to the cathodes of tube 30 to control the output of this auxiliary rectifier. A 4-microfarad condenser 44 is provided in a path connecting the cathodes of tube 30 with the common terminal of resistors 31 and 32.

A second auxiliary rectifier 50 of the varistor bridge type is supplied with current from secondary transformer winding 20, the output of the rectifier being provided with a resistance-capacity filter comprising four-microfarad condensers 51 and 52 and 22,000-ohm resistor 53. The negative terminal of the filtered output voltage of rectifier 50 is connected through 47,000-ohm resistors 54 and 55, respectively, to the control grids of tubes 10 and 11 and the positive terminal of the rectifier 50 is connected to the adjustable tap of potentiometer 35.

When current from source 12 is initially supplied to the regulated rectifier circuit upon closure of switch 23, the output voltage (about 22 volts) of auxiliary rectifier 50 biases the control electrodes of tubes 10 and 11 negatively with respect to the cathodes to prevent conduction of space current in tubes 10 and 11, the positive terminal of rectifier 50 being connected to the cathodes of tubes 10 and 11 through potentiometer 35, resistor 34 and the load 15 shunted by electrolytic condenser 14. In a few seconds the cathodes of auxiliary rectifier tube 30 will begin to emit electrons and current will commence to flow in a circuit comprising resistor 41, condenser 40 and resistors 31 and 32 in series to charge condenser 40. When the charging of condenser 40 is initiated, substantially the entire output voltage of the auxiliary rectifier comprising tube 30 will appear across resistor 41 and the resulting relatively large negative biasing voltage in the control electrode-cathode circuits of tube 30 limits the auxiliary rectifier output voltage to about 25 volts. As the condenser charges, this biasing voltage across resistor 41 decreases thus causing the rectifier output voltage to increase correspondingly. The output voltage of auxiliary rectifier 30 is in opposition to the output voltage of auxiliary rectifier 50 in the control electrode-cathode circuit of tubes 10 and 11, and, therefore, as the charge on condenser 40 increases the resultant negative grid biasing voltage of tubes 10 and 11 decreases. When the resultant negative biasing voltage has decreased sufficiently the tubes 10 and 11 will commence to pass space current.

After tubes 10 and 11 of the main rectifier begin to pass space current, the condenser 40 continues to charge, the output voltage of auxiliary rectifier 30 continues to increase and, therefore, the control electrodes of tubes 10 and 11 are made relatively less negative or more positive with respect to the cathodes, thus causing the current supplied to the load to increase gradually, thus avoiding sudden changes in output current and voltage. When the output voltages of the main rectifier and of the auxiliary rectifier 30 become sufficiently high, the voltage regulating tube 33 becomes conducting and the regulator circuit is then in condition for normal operation.

It is thus seen that the flow of space current in tubes 10 and 11 of the main rectifier is delayed for a period which is required for heating the cathodes of these tubes to operating temperature. When the current supply from source 12 is interrupted, condenser 40 discharges at a certain rate through a circuit comprising the grid-cathode paths of tube 30, resistor 36, potentiometer 35, resistor 34 and the load. When the cathode of tube 30 cools, grid-cathode current in tube 30 ceases and the condenser 40 discharges at a different rate through a circuit comprising resistor 41, resistor 36, potentiometer 35, resistor 34 and the load 15. If the current supply from source 12 is restored while an appreciable charge remains on condenser 40, the starting time delay will be reduced. The shorter the interruption of the current supply from source 12, the larger will be the initial charge on condenser 40 and the shorter will be the delay period in which the rectifier tubes 10 and 11 are non-conducting. This is a desired condition since the supply of rectified current to the load should be interrupted only for the period required for heating the cathodes of rectifier tubes 10 and 11 to operating temperature.

In normal operation of the regulated rectifier, if the line voltage from source 12 increases, for example, the output voltage of rectifier 50 will increase so as to make the control electrodes of tubes 10 and 11 relatively more negative with respect to the cathodes, thus preventing or minimizing a rise of load current and the resulting rise of load voltage. In addition to the output voltage of auxiliary rectifier 50, there are present in the control electrode-cathode circuits of rectifier tubes 10 and 11 the substantially constant voltage across resistor 34 and a portion of potentiometer 35 in series and the voltage across the load 15. The voltage across the resistor 34 and the portion of potentiometer 35 in the grid-cathode circuits of tubes 10 and 11 is opposed to the voltage across the load 15 and to the voltage from rectifier 50, the potentiometer 35 being adjusted to set the resulting grid-cathode voltage of tubes 10 and 11 so as to fix the load voltage at a desired value, say 48 volts, this load voltage being less than the voltage across the cold cathode tube 33 which may be 150 volts, for example. When the load voltage rises due to a decrease in load, for example, the control electrodes of tubes 10 and 11 will become relatively more negative with respect to the cathodes, thereby minimizing the increase in load voltage.

What is claimed is:

1. In combination, a first space discharge device having an anode, a cathode and a control electrode, a space current circuit connecting said anode and said cathode including a source of current, a second space discharge device having an anode, a cathode and a control electrode, a second circuit connecting said anode and said cathode of said second device including a current source, a circuit connecting the control electrode and cathode of said first device including a portion of said second circuit for setting up a biasing voltage in said control electrode-cathode circuit of said first device, a current path comprising a resistor and a condenser to which space current flowing through said second device is supplied for charging said condenser and a circuit including said resistor connecting the control electrode and cathode of said second device, thereby setting up in the control electrode-cathode circuit of said first device for controlling the space current of said first device a changing voltage, the instantaneous amplitudes of which are determined by the time constant of said condenser charging circuit.

2. In combination, a first and a second space discharge device each having an anode, a cathode and a control electrode, a first circuit connecting the anode and cathode of said first device including a current source and a load to which current is supplied from said source, a second circuit connecting the anode and cathode of said second device including a current source and said load, means for setting up a voltage for controlling the potential of the control electrode of said second device with respect to its cathode potential comprising a condenser and a charging circuit for said condenser including the anode-cathode path of said second device, and a third circuit comprising said load connecting the control electrode and cathode of said first device, whereby there is set up in response to the current supplied to said load through the anode-cathode path of said second device a voltage for biasing the control electrode with respect to the cathode of said first device.

3. The combination with a first space discharge rectifying device for rectifying and supplying to a load current from a first alternating current source, said device having an anode, a cathode and a control electrode, of means for controlling said rectifying device to control the current supplied to said load comprising a second space discharge having an anode, a cathode and a control electrode, a circuit connecting the anode and cathode of said second discharge device comprising in series said load, a resistance means and a second alternating current source, a gaseous discharge device connected across said resistance means which becomes conducting when the voltage drop across said resistance means reaches a sufficiently high value, means for connecting the control electrode of said first space discharge device to said resistance means, a condenser, a charging circuit for said condenser comprising in series with said condenser said second current source the anode-cathode path of said second space discharge device and a resistor, one terminal of said resistor being connected to the cathode of said second space discharge device, and means for connecting the other terminal of said resistor to the control electrode of said second space discharge device thereby controlling the potential of the control electrode of said first space discharge device with respect to its cathode for delaying the flow of space current in said first device during an initial period determined by the time constant of said condenser charging circuit and for subsequently controlling said control electrode potential to minimize load voltage changes.

4. A combination in accordance with claim 3 in which the first and second sources of alternating current are derived from a common alternating current supply source and in which said means for connecting said control electrode of said first space discharge device to said resistance means comprises a source of unidirectional voltage having variations corresponding to voltage changes of said supply source.

5. A regulated rectifier comprising a main rectifier for rectifying current from an alternating current supply source and for supplying the rectified current to a load, a shunt current path connected across said load comprising in series resistance means and an auxiliary rectifier supplied with current from said supply source to set up a unidirectional output voltage, one terminal of said resistance means being connected to the negative load terminal, the other terminal of said resistance means being connected to the positive output terminal of said auxiliary rectifier, a gaseous discharge device connected across said resistance means, a current path comprising a resistor and a condenser to which charging current for said condenser is supplied from said auxiliary rectifier, means for utilizing the potential difference across said resistor for controlling the output current of said auxiliary rectifier, and means for utilizing the voltage across said load and a portion at least of said resistance means in series for controlling the output current of said main rectifier.

6. A regulated rectifier in accordance with claim 5 in which said gaseous discharge device has a breakdown voltage greater than the operating voltage across the load.

7. A regulated rectifier in accordance with claim 5 in which there is provided a second auxiliary rectifier for rectifying alternating current from said supply source to set up a unidirectional output voltage and in which there is impressed on the means for controlling the output current of said main rectifier the vector sum of said output voltage of said second auxiliary rectifier, the voltage across a portion at least of said resistance means and the voltage across said load, the voltage component across a portion at least of resistance means having a polarity which is opposed to the remaining two voltage components when current is being supplied to said load during normal operation.

8. A regulated rectifier in accordance with claim 5 in which said main rectifier comprises a gas-filled space discharge device having an anode, a cathode and a control electrode and in which there are provided a second auxiliary rectifier for rectifying current from said supply source, means for connecting the negative output terminal of said second auxiliary rectifier to said control electrode, and means for connecting the positive output terminal of said second auxiliary rectifier to said resistance means, the cathode of said space discharge device being connected to the positive load terminal to complete a control electrode-cathode circuit for said space discharge device.

9. A regulated rectifier comprising a main rectifier including a first space discharge device having an anode-cathode and a control electrode for supplying rectified current to a load, the cathode of said device being connected to the positive load terminal, means for supplying heating current to said cathode, a shunt current path connected across said load comprising in series resistance means and a first auxiliary rectifier including a second space discharge device having an anode, a cathode and a control electrode, one terminal of said resistance means being connected to the negative load terminal, the other terminal of said resistance means being connected to the cathode of said second space discharge device, a gas-filled electric discharge device connected across said resistance means which device becomes conducting when the sum of the output voltages of said main rectifier and of said auxiliary rectifier becomes sufficiently high, the breakdown voltage of said gas-filled discharge device being higher than the output voltage of said main rectifier, a second auxiliary rectifier for producing an output voltage, means for connecting the positive terminal of said second auxiliary rectifier to said resistance means, means for connecting the negative terminal of said second auxiliary rectifier to the control electrode of said first space discharge device, and means for causing said main rectifier to supply rectified current to said load following a delay period during which the cathode of said first space discharge device is being heated to operating temperature, said means comprising a current path having a condenser and a resistor in series, means for supplying current from said first auxiliary rectifier to said current path for charging said condenser, means for connecting one terminal of said resistor to the cathode of said second space discharge device, and means for connecting the other terminal of said resistor to the control electrode of said second space discharge device thereby biasing the control electrode with respect to the cathode of said second space discharge device to cause the output current of said first auxiliary rectifier to increase gradually at a rate determined by the charging rate of said condenser.

JAMES A. POTTER.